United States Patent [19]

Rodriguez-Cavazos et al.

[11] Patent Number: 4,972,127
[45] Date of Patent: Nov. 20, 1990

[54] PINCUSHION CORRECTION CIRCUIT WITH GULLWING COMPENSATION

[75] Inventors: Enrique Rodriguez-Cavazos; Nancy D. Graves; Ronald E. Fernsler, all of Indianapolis, Ind.

[73] Assignee: RCA Licensing Corporation, Princeton, N.J.

[21] Appl. No.: 515,922

[22] Filed: Apr. 27, 1990

[51] Int. Cl.$^5$ ............................................. H01J 29/56
[52] U.S. Cl. ..................................................... 315/371
[58] Field of Search .......................................... 315/371

[56] References Cited

U.S. PATENT DOCUMENTS

| | | | |
|---|---|---|---|
| 3,700,958 | 10/1972 | Haferl | 315/24 |
| 3,721,857 | 3/1973 | Haferl | 315/27 |
| 4,642,530 | 2/1987 | Rodriguez-Cavazos | 315/371 |
| 4,668,897 | 5/1987 | Haferl | 315/371 |
| 4,682,085 | 7/1987 | Haferl et al. | 315/371 |
| 4,687,972 | 8/1987 | Haferl | 315/371 |
| 4,777,412 | 10/1988 | Leonardi | 315/371 |
| 4,810,939 | 3/1989 | Watanabe et al. | 315/371 |
| 4,827,193 | 2/1989 | Watanuki et al. | 315/371 |

Primary Examiner—Theodore M. Blum
Attorney, Agent, or Firm—Joseph S. Tripoli; Joseph J. Laks; Harvey D. Fried

[57] ABSTRACT

A circuit provides North-South pincushion correction and gullwing compensation in a raster display of a television apparatus. A correction circuit generates a generally parabolic, horizontal rate correction signal to correct for North-South pincushion distortion. A gullwing compensation circuit is coupled to the correction circuit and forms a feedback path therein for amplitude modifying the correction signal to further correct for gullwing distortion. The gullwing compensation circuit amplitude modifies the generally parabolic signal as a function of itself, achieving an equilibrium condition. A vertical deflection circuit drives a vertical deflection coil with the gullwing compensated correction signal. The correction circuit comprises a ramp waveform generator having a controllable current source generating a constant component of current for pincushion correction and a variable component of current responsive to the feedback signal for gullwing compensation. The variable component of current varies inversely to the feedback signal, which is coupled in the feedback path to the controllable current source through an inverting amplifier. The output of the inverting amplifier modulates the current supply to modify the resulting shape for the parabolic signal to compensate for gullwing distortion by increasing the slope of the parabola on both lateral sides.

19 Claims, 2 Drawing Sheets

PINCUSHION CORRECTION CIRCUIT WITH GULLWING COMPENSATION

This invention relates to the field of circuits for correcting North-South pincushion distortion in a raster display, and in particular, to preventing gullwing distortion.

A theoretically perfect, square and linear raster pattern 24 is shown schematically in FIG. 5. Producing such a raster in a television apparatus requires accurate scanning of the raster beam at all points in the display. In a color CRT, a single scanning electron beam normally produces the raster, and care is taken to accurately deflect the electron beam to obtain the required pattern. Auxiliary deflection yokes may be employed in televisions having large direct view CRTs and in projection televisions to correct inaccuracies in scanning caused by circuit characteristics and by the geometry of the projection surface. In rear projection television sets, for example, three rasters are formed by individual monochrome CRTs and are projected over one another onto a single screen to form the color image. The projection angles of the three rasters cannot be identical because the projection sources are at different positions relative to the projection axis. The resulting geometric distortions of the projected images cause misregistration of the monochrome images. Moreover, the original rasters may not be perfectly squared and linear due to the same geometric and circuit considerations that apply to direct view television sets.

Distortion in a raster display can be caused by various attributes of the deflection circuits, by the geometry of the projection surface and by other factors. Various distortions occur in most forms of television displays, and these must be corrected when controlling deflection of the scanning electron beam, in order to obtain a squared, linear and properly registered display. One form of distortion of a raster is known as North-South or Top-Bottom pincushion distortion. Typical uncorrected North-South pincushion distortion 20 is shown in FIG. 1. This form of distortion may be caused by a difference in position of the electron beam deflection center(s) and the face plate curvature center (which may be at infinity for a flat CRT). Such pincushion distortion, and some other forms of distortion, can be corrected by applying current to an auxiliary deflection yoke at a level dependent on the particular position of the scanning point of the electron beam in the raster display. A correction signal can be applied to a vertical deflection yoke to displace the scan lines upwardly at the upper middle of the raster, downwardly at the lower middle, and so forth, to correct North-South pincushion distortion.

The necessary waveshape of a current applied to an auxiliary deflection yoke that will correct North-South pincushion distortion is a parabola recurring at the horizontal scan rate of the raster. The parabola can be modulated in amplitude by a sawtooth recurring at the vertical rate, so as to provide maximum correction of a given polarity at the top of the raster; no correction at the center; and, maximum correction of the opposite polarity at the bottom of the raster. A schematic representation of this correction signal is shown in FIG. 2, wherein a vertical rate sawtooth 38 modulates a parabola-shaped correction signal, and provides reversed polarity parabolas 34, 36 at amplitudes required for correction of the upper and lower scan lines of the raster, respectively.

The shape of the parabola in the correction signal determines the accuracy of correction of the pincushion distortion. Depending on the CRT and yoke combination, and the shape of a parabolic correction signal applied thereto, a second form of distortion may occur in the raster. This distortion is known as gullwing distortion and is shown schematically by raster grid 22 in FIG. 3. The scan lines at the top and the bottom of the raster have a larger radius of curvature at the center than they do at the edges of the display. When a parabolic correction signal is applied to correct pincushion distortion, for example in the monochrome CRTs of a rear projection apparatus, the top and bottom lines of the raster may be inaccurately corrected, resulting in this gullwing distortion.

It is possible to further correct distortion of the raster by modifying the current applied to the auxiliary deflection yoke to cancel gullwing distortion. The required change is a reduction in the absolute value of the correction signal corresponding with the humps of the distorted raster scan lines, which may be bilateral as shown in FIG. 3. Such a modification of a parabolic correction waveform is shown in FIG. 4. The sides of the parabola are modified to have a steeper slope than otherwise generated in the parabola for correcting pincushion distortion. Inasmuch as the extent of gullwing distortion is greater at the top and bottom of the raster and less towards the center (the same as pincushion distortion), the shape of the parabola can be modified before modulating the parabola by the vertical sawtooth, as discussed above. FIG. 4 illustrates both a typical parabola 42 for correcting pincushion distortion and a modified parabola 44 for correcting gullwing distortion.

In order to produce the necessary compensation of the current applied to an auxiliary deflection yoke to correct pincushion and/or gullwing distortions, the prior art has developed a number of techniques. Reference can be made to the following United States patents for examples of circuits intended to correct various forms of pincushion and/or gullwing distortion: Nos. 4,642,530; 4,777,412; 4,668,897; 4,682,085; 4,687,972; 4,810,939; and 4,827,193. These prior art solutions to the problem of correcting pincushion and gullwing distortions rely on circuit elements such as tuned inductor circuits, LC resonators, nonlinear compensating circuits and the like. There is a need to improve pincushion and gullwing correction circuits whereby the effectiveness of correction is maximized, while the number and complexity of the components needed are reduced.

It is an aspect of the invention to compensate for both pincushion distortion and gullwing distortion by modifying a generally parabolic correction signal. In accordance with this aspect of the invention, a generally parabolic correction signal is produced by integrating a ramp signal at the horizontal rate. The integrated signal is fed back into the ramp generating circuit to increase the slope of the sides of the parabola, preferably modifying the ramp signal in inverse proportion to the parabolic correction signal. The modified parabolic correction signal effectively compensates for both pincushion and gullwing distortion.

It is another aspect of the invention to correct gullwing distortion at little additional cost, in terms of components and assembly. In accordance with this aspect of the invention, only a small number of circuit components are needed in addition to those already used to produce the parabolic correction signal needed for correcting pincushion distortion.

In accordance with these and other aspects of the invention, a circuit provides North-South pincushion correction and gullwing compensation in a raster display of a television apparatus. A correction circuit generates a generally parabolic, horizontal rate correction signal to correct for North-South pincushion distortion. A gullwing compensation circuit is coupled to the correction circuit and forms a feedback path therein for amplitude modifying the correction signal to further correct for gullwing distortion. The gullwing compensation circuit modifies the generally parabolic signal as a function of itself, achieving an equilibrium condition. More particularly, the gullwing correction circuit amplitude modifies the generally parabolic signal inversely to itself. A vertical deflection circuit drives a vertical deflection coil with the gullwing compensated correction signal.

In accordance with an illustrated embodiment, the correction circuit comprises a ramp waveform generator having a controllable current source generating a constant component of current for pincushion correction and a variable component of current responsive to the feedback signal for gullwing compensation. The variable component of current varies inversely to the feedback signal, which is coupled in the feedback path to the controllable current source through an inverting amplifier. The output of the inverting amplifier modulates the current supply to modify the resulting shape of the parabolic signal to compensate for gullwing distortion by increasing the slope of the parabola on both lateral sides.

Figure 1:
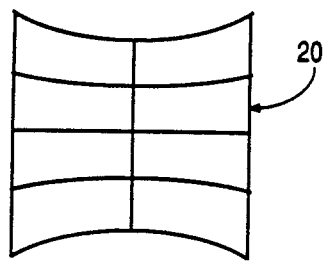
FIG. 1 is a diagram representing a raster display characterized by pincushion distortion.
Figure 2:
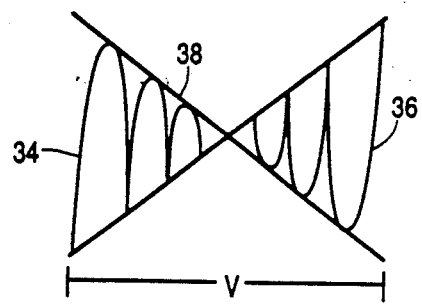
FIG. 2 is a signal diagram showing a parabolic correction signal for correcting pincushion distortion.

The raster display 20 shown in FIG. 1 is distorted by North-South or Top-Bottom pincushion distortion. Although the display may be centered, the horizontal scanning lines of the raster are not parallel. The horizontal lines are bowed inwardly toward the center of the display by an amount which is greater for the lines at the top and bottom, and lesser progressing toward the center. The bowed lines have a parabolic or hyperbolic shape. The bowing can be corrected by means of an auxiliary deflection yoke to which a current is applied at a time varying level over a vertical interval as shown in FIG. 2. Only a small number of horizontal rate parabolas are shown for purposes of clarity. In order to account for the variation in the extent of bowing from the top or bottom of the display toward the center, the parabolic signal applied to the auxiliary-yoke for cancelling the bowing is modulated at the vertical rate by a sawtooth wave producing a maximum amplitude at the vertical center, and minimum amplitude at the top and bottom. The top lines of the pincushion distorted raster bow downwardly and the bottom lines bow upwardly. Accordingly, the polarity of the parabolic signal is reversed at the center.

Figure 3:
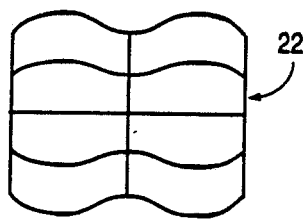
FIG. 3 is a diagram representing a raster display characterized by gullwing distortion.
Figure 4:
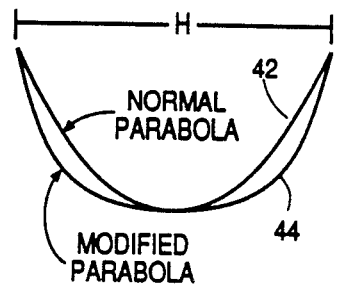
FIG. 4 is a signal diagram showing a parabolic pincushion correction signal over a single horizontal scan interval, and including a modified parabolic waveshape for further correcting gullwing distortion in accordance with an aspect of the invention.
Figure 5:
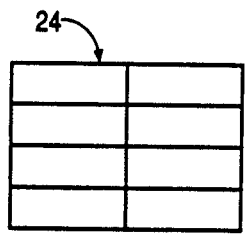
FIG. 5 is a diagram representing a fully corrected raster.

A residual error results when the parabola produced does not precisely cancel the bowing of the horizontal scan lines, resulting in gullwing distortion 22, shown in FIG. 3. According to an aspect the invention, circuitry used to produce a modified parabolic correction signal is arranged to change the normal pincushion correcting parabola 42 to a modified parabola 44 for also correcting gullwing distortion. The normal and modified parabolas 42, 44 are shown in FIG. 4. The result of applying the modified parabola is the squared and linear raster 24 of FIG. 5. The particular change made to the normal parabola is a reduction in amplitude at both sides of the raster at the area of the bilateral humps which are shown in FIG. 3. The corresponding alteration of the normal parabola 42 is an increase in the slope of the parabola at both sides, the normal and modified parabolas 42, 44 having the same values at the endpoints and at the center, and the modified parabola 44 having a reduced value between the center and the endpoints.

The extent of gullwing distortion is greater at the top and bottom of the raster, and is reversed in polarity between the top and the bottom, in the same manner as the pincushion distortion 20 as shown in FIG. 1. The compensation applied to the signal for correcting the gullwing distortion can be applied prior to modulating the correction signal with the vertical rate sawtooth 38. Therefore, the extent of gullwing correction and the pincushion correction are both at a maximum absolute value at the top and bottom, and at a minimum value at the center. The modulated and compensated correction signal is coupled to an auxiliary deflection yoke through a vertical pincushion correction circuit, including for example an output amplifier for driving the auxiliary yoke at a current proportional to the level of the correction signal.

Figure 6:
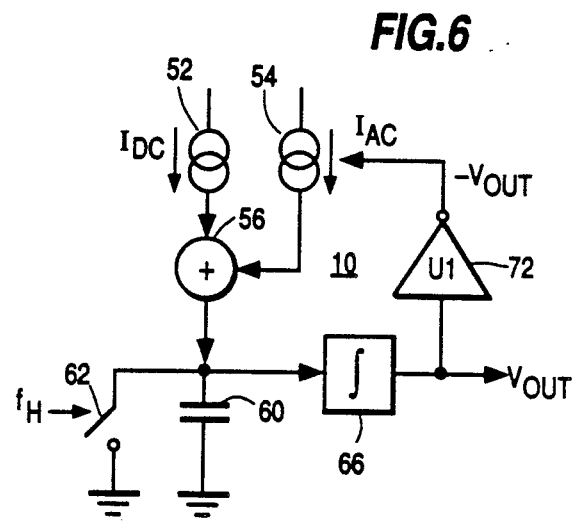
FIG. 6 is a schematic block diagram of a pincushion and gullwing correction circuit in accordance with an aspect of the invention.

With reference to the block diagram of FIG. 6, a parabola is produced at the horizontal scan rate by producing a rising ramp at that rate, and integrating the ramp signal. A constant current source 52, producing current $I_{DC}$, is coupled to an integrating capacitor 60. The capacitor 60 is repetitively charged over the horizontal scan line, and then discharged, for example by switching means 62, upon triggering via the horizontal deflection or synchronizing signals, producing a ramp signal $V_{RAMP}$ recurring at the horizontal rate. The ramp signal at integrating capacitor 60 is coupled to an integrator 66 to produce a parabola output signal $V_{OUT}$.

In accordance with an aspect of the invention, the gullwing correction is obtained by feeding back the pincushion correcting parabola to modify the ramp signal which is integrated to obtain the parabola. The output signal $V_{OUT}$ of the integrator 66 is inverted via an inverting amplifier 72, the output of which, $-V_{OUT}$, controls a variable current source 54. The constant current $I_{DC}$ from the constant current source and the variable current $I_{AC}$ produced in inverse proportion to the level of the correcting parabola are summed at a summing junction 56, for example at the ungrounded terminal of the integrating capacitor 60. The current source may also be thought of as a controllable current source, having current $I_{DC}$ as a constant component and current $I_{DC}$ as a variable component. The effect of the variable current $I_{AC}$ is such that the capacitor 60 is charged faster when the parabola at the output of integrator 66 is at a minimum level, and more slowly when the parabola is at a maximum. As a result, the slope of the parabola is made more steep on both lateral sides than would otherwise be produced, and the modified parabola 44 of FIG. 4 is obtained. The component values of the circuit are chosen such that the level of the parabola at the top central point of the raster, at full amplitude, precisely cancels the pincushion distortion. Gullwing distortion is minimized by the variation in the shape of the parabola due to feeding back the inverted parabola to control generation of the ramp. The integrating capacitor 60 is charged at a rate modified as a function of the instantaneous level of the parabola.

Figure 7:
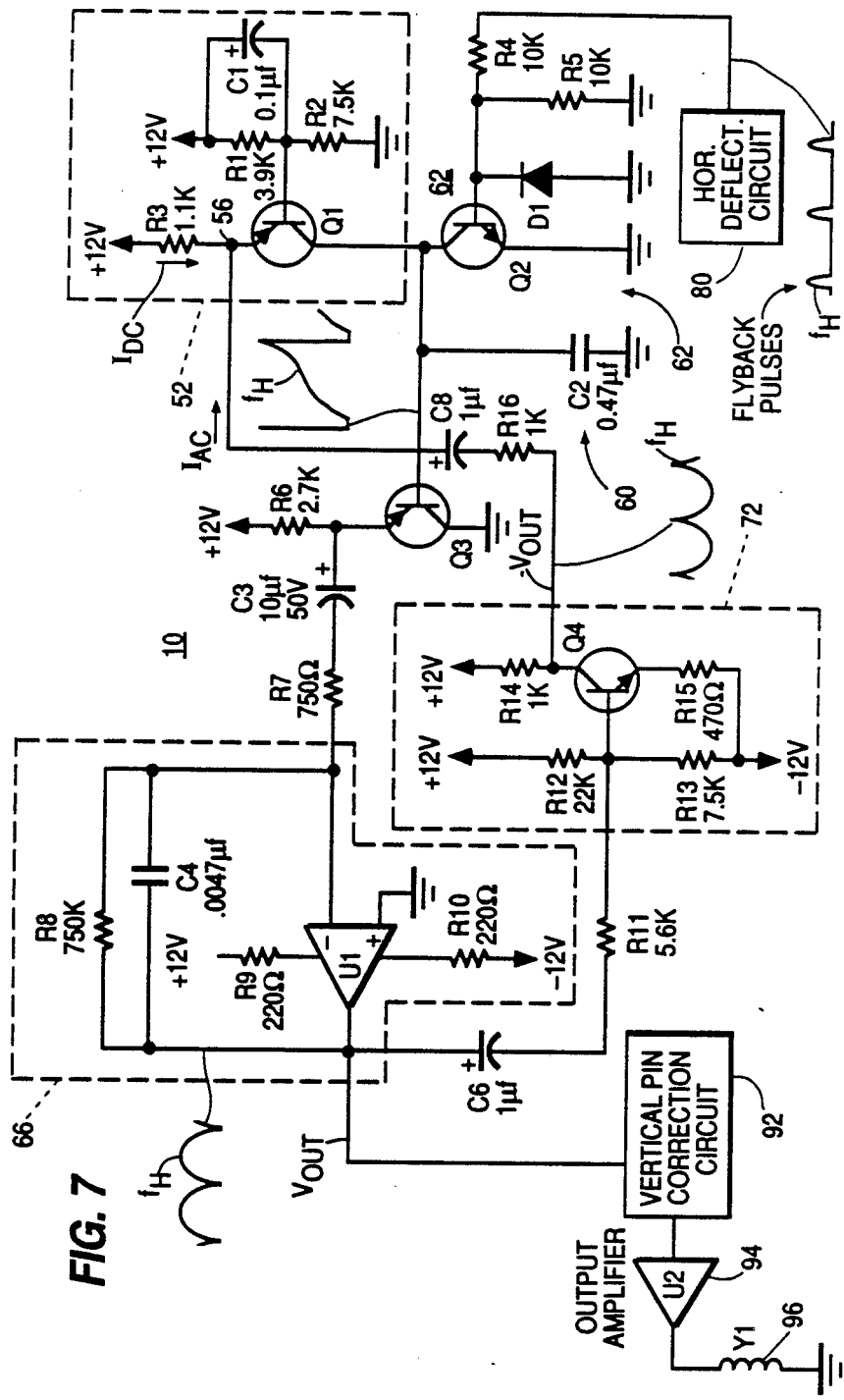
FIG. 7 is a detailed schematic diagram of a circuit for implementing a pincushion and gullwing correcting circuit according to an aspect of the invention.

FIG. 7 is a circuit schematic for an embodiment of the invention shown in block form in FIG. 6. A current source 52 is obtained by providing a constant voltage at the base of PNP transistor Q1, for example by coupling the base of Q1 to a voltage divider defined by resistors R1 and R2, connected in series between the positive power supply voltage and ground. A decoupling capacitor C1 reduces ripple and/or high frequency components. The emitter of Q1 is coupled to the positive voltage supply through a resistor R3. Q1 can be considered for the moment to conduct at a constant rate, as the voltage drop across the emitter-base junction is substantially fixed and a DC level is applied to the base by means of the voltage divider defined by R1 and R2. The constant current charges an integrating capacitor 60, namely capacitor C2, coupled in parallel between the collector of Q1 and ground. An NPN transistor Q2 defines a switching means 62 arranged to discharge integrating capacitor C2 to ground, and is controlled by the horizontal deflection circuit. The flyback pulse from the horizontal deflection circuit, for example, can be coupled to Q2 through series and parallel resistors R4 and R5, whereby Q2 is arranged to conduct briefly during the horizontal retrace, to discharge C2 and repeat a cycle at the horizontal rate. The base of Q2 is preferably clamped to ground by diode D1. The combination of the current source, integrating capacitor and recurrent discharge switching means produces a repetitive ramp voltage across integrating capacitor C2 at the horizontal rate.

The ramp voltage as produced at integrating capacitor C2 is modified in a manner which will be explained in more detail hereinafter to produce the waveform shown in FIG. 7, namely a modified ramp having a relatively reduced slope at a midpoint thereof. The signal at capacitor C2 is coupled to a follower amplifier stage comprising PNP transistor Q3 and resistor R6. The signal is then applied via an AC coupling capacitor C3 and series resistor R7 to the integrator 66, with biasing resistor R8 coupling the input to the positive supply.

The integrator 66 includes an operational amplifier U1, to which the modified ramp signal is applied at the inverting input. A feedback capacitor C4 is coupled between the output of the operational amplifier and the inverting input, forming an integrating amplifier. The integrating capacitor is discharged during the horizontal retrace, for example by resistor R8. The operational amplifier is coupled to a +12V supply through current limiting resistor R9 and to a −12V supply through resistor R10.

The integrating amplifier produces a parabolic output waveform as shown in FIG. 7 at the output of operational amplifier U1. This waveform provides an input to the vertical PIN (pincushion) correction circuit 92, wherein the parabolic waveform is modulated by a ramp at the vertical rate, and reversed in polarity for the bottom half of the raster, in a known manner as discussed above. The resulting signal (shown in FIG. 2) is amplified via output amplifier 94 (U2), producing a current to drive auxiliary deflection yoke 96 (Y1).

Should the circuit be arranged such that a smooth ramp is provided at capacitor C2 by charging at a constant rate due only to controlling transistor Q1 of the current supply 52 to conduct at a constant rate via voltage divider R1/R2 or the like, the resulting parabola at the output of the integrating amplifier may not match the pincushion distortion as accurately as needed to provide a precisely square and linear raster 24 (FIG. 5), instead producing gullwing distortion 22 (FIG. 3). According to the invention, the parabolic signal at the output of the integrating amplifier 66 is inverted and fed back to modify the ramp obtained at capacitor C2.

The inverted parabola is a signal which will modify the charging rate of integrating capacitor C2 to thereby modify the basic parabolic correction signal 42 to obtain increased slope at the lateral sides of the waveform and to obtain gullwing correction as needed at the lateral sides of the raster. The output of the integrating amplifier 66 formed by operational amplifier U1 and capacitor C4 is AC coupled to an inverting amplifier 72 via series capacitor C6. Inverting amplifier 72 is embodied as an NPN transistor Q4. The AC coupled output is coupled to transistor Q4 through resistor R11. The base of transistor Q4 is biased by resistors R12 and R13. Resistors R14 and R15 set the gain for transistor Q4. The inverted parabolic signal at the collector of Q4 as shown in AC coupled via series resistor R16 and capacitor C8 to the emitter of transistor Q1, which is the source of current to integrating capacitor C2. The emitter of transistor Q1 thus provides a summing junction for a constant current source and a variable current source, the latter being controlled by the inverted parabolic signal. Transistor Q4 provides a variable current affecting the charging rate of capacitor C2, the variable current being inversely proportional to the level of the parabolic correction signal.

The charging rate of integrating capacitor C2 is relatively greater during the portions of the horizontal interval corresponding to the lateral sides of the raster, and relatively less during the portion corresponding to the center of a horizontal scan. A modified ramp having a relatively flattened midportion is thereby obtained, as shown in FIG. 7 at capacitor C2. Upon integrating this modified ramp, the resulting parabola as coupled to the auxiliary deflection yoke 96 through the PIN correction circuit 92 and output amplifier 94. The modified parabolic waveform corrects for residual gullwing distortion.

The parabola signal is the signal fed back to the inverting amplifier of Q4 for modulating the current source of Q1 according to an aspect of the invention. The circuit reaches an equilibrium condition, balancing the effects of the constant component of the current source and the variable component of the current source due to the feedback signal, to obtain the modified parabolic waveform shown in FIG. 4. An effective pincushion and gullwing correction apparatus is thus provided, with minimal complexity and additional circuit elements as compared to a device for correcting pincushion distortion alone.

What is claimed is:

1. A circuit for providing North-South pincushion correction and gullwing compensation in a raster display of a television apparatus, comprising:
    a correction circuit for generating a generally parabolic, horizontal rate correction signal for correcting North-South pincushion distortion;
    a gullwing compensation circuit coupled as a feedback path of said correction circuit for amplitude modifying said generally parabolic horizontal rate signal by a generally parabolic horizontal rate feedback signal to define an equilibrium output signal for correcting said pincushion distortion and gullwing distortion; and,
    a vertical deflection circuit for driving a deflection coil with said equilibrium output signal.

2. The circuit of claim 1, wherein said equilibrium output signal is said feedback signal.

3. The circuit of claim 1, wherein said correction circuit comprises a ramp waveform generator having a current source generating a constant component of current for said North-South pincushion correction and a variable component of current responsive to said feedback signal for gullwing compensation.

4. The circuit of claim 3, wherein said feedback signal controls said variable component of current inversely to said equilibrium output signal.

5. The circuit of claim 1, wherein said gullwing compensation circuit comprises an inverting amplifier.

6. The circuit of claim 1, wherein said correction circuit comprises a ramp generator, a controllable current supply for said ramp generator and an integrator coupled to said ramp generator for producing said generally horizontal rate parabola; and, said gullwing compensation circuit comprises an inverting amplifier having an input coupled to an output of said integrator and an output coupled to said controllable current supply.

7. The circuit of claim 6, wherein said current supply comprises a current supply transistor having an emitter coupled to a supply voltage of the circuit through a series resistor, and means supplying a fixed voltage at a base of the current supply transistor, said output of said inverting amplifier being coupled to said emitter to relatively increase a charging rate of said integrator at a beginning and end of each horizontal scanning interval.

8. A circuit for providing North-South pincushion distortion and gullwing compensation in a raster display of a television apparatus, comprising:
    a controllable current source;
    an integrating capacitor coupled to said controllable current source and operable to produce a ramp signal;
    means for discharging said capacitor and resetting said ramp signal during horizontal retrace;
    an integrator having an integrator input coupled to said ramp signal and an integrator output, said integrator producing a substantially parabolic signal at said integrator output for North-South pincushion correction, said integrator output being coupled to a pincushion correction circuit; and,
    an inverting amplifier having an inverter input coupled to said integrator output and an inverter output coupled for controlling said current source to modify said substantially parabolic signal for gullwing compensation.

9. The circuit of claim 8, comprising a current supply transistor having a preset DC voltage applied to a base thereof for producing a constant current, an emitter coupled to said inverting output and to a supply voltage, and a collector coupled to said capacitor.

10. The circuit of claim 8, wherein said integrator comprises an operational amplifier having a feedback capacitor.

11. The circuit of claim 10, wherein said ramp signal is coupled to said input of said operational amplifier through a follower amplifier.

12. The circuit of claim 8, wherein said capacitor is coupled to said integrator input through a follower amplifier.

13. The circuit of claim 8, wherein said inverter input and said output of said integrator are AC coupled.

14. A circuit for providing North-South pincushion distortion and gullwing compensation in a raster display of a television apparatus, comprising:
    a controllable current source;
    an integrating capacitor coupled to said controllable current source and operable to produce a ramp signal;
    means coupled to said capacitor for resetting said ramp signal at a horizontal rate;
    an integrator having an input coupled to said ramp signal and generating an output signal coupled to a pincushion correction circuit; and,
    means having an input coupled to said integrator output and an output coupled for varying said controllable current source to modify said output signal to provide gullwing compensation.

15. The circuit of claim 14, wherein said controllable current source comprises a current supply transistor having a preset DC voltage applied to a base thereof for producing a constant current, an emitter coupled to said inverting output and to a supply voltage, and a collector coupled to said capacitor.

16. The circuit of claim 14, wherein said means for varying said controllable current source comprises an inverting amplifier.

17. The circuit of claim 14, wherein varying said controllable current source modifies said ramp signal, which in turn modifies said output signal.

18. The circuit of claim 14, wherein said means for varying said controllable current source defines a feedback path for modifying said output signal as a function of itself, said output signal having a waveshape representing an equilibrium condition.

19. The circuit of claim 18, wherein said output signal is mofified as an inverse function of itself.

* * * * *